United States Patent [19]
Brandli

[11] 3,867,991
[45] Feb. 25, 1975

[54] SHOCK ABSORBING SUSPENSION SYSTEM FOR A SNOWMOBILE

[75] Inventor: Ronald I. Brandli, Roseau, Minn.

[73] Assignee: Textron Inc., Providence, R.I.

[22] Filed: Nov. 19, 1969

[21] Appl. No.: 877,943

[52] U.S. Cl. ............................ 180/5 R, 280/21 R
[51] Int. Cl. ............................................. B62m 27/00
[58] Field of Search .................................. 180/3–6; 280/8, 9, 10, 11, 12, 13, 14, 21, 25, 26, 16, 17; 244/108, 104 LS; 267/31, 18, 8

[56] References Cited
UNITED STATES PATENTS

| | | | |
|---|---|---|---|
| 1,833,210 | 11/1931 | Ditter | 244/108 |
| 1,891,188 | 12/1932 | Stalb | 244/108 |
| 1,892,064 | 12/1932 | Markey | 244/108 |
| 2,274,227 | 2/1942 | Willard | 267/58 X |
| 3,166,338 | 1/1965 | Romsdal | 280/21 |
| 3,425,707 | 2/1969 | Horiuchi | 280/21 |
| 3,494,438 | 2/1970 | Rose | 180/5 |
| 3,525,412 | 3/1970 | Erickson | 180/5 |

OTHER PUBLICATIONS

'69 Polaris Accessories, Polaris Industries, Inc., Roseau, Minn., front and back pages, Item 18, apparently released to public May, 1968.

*Primary Examiner*—Philip Goodman
*Attorney, Agent, or Firm*—Merchant, Gould, Smith & Edell

[57] ABSTRACT

A suspension system for a snowmobile having a pair of front-running skis is disclosed, the skis being movable to guide the vehicle and compensate for terrain irregularities. A set of leaf springs is disposed between each of the skis and the snowmobile to cushion the vehicle from bumps encountered by the skis, and a shock absorber is connected between an intermediate point on the leaf springs and the top of the ski in order to dampen vibrations in the leaf springs.

8 Claims, 3 Drawing Figures

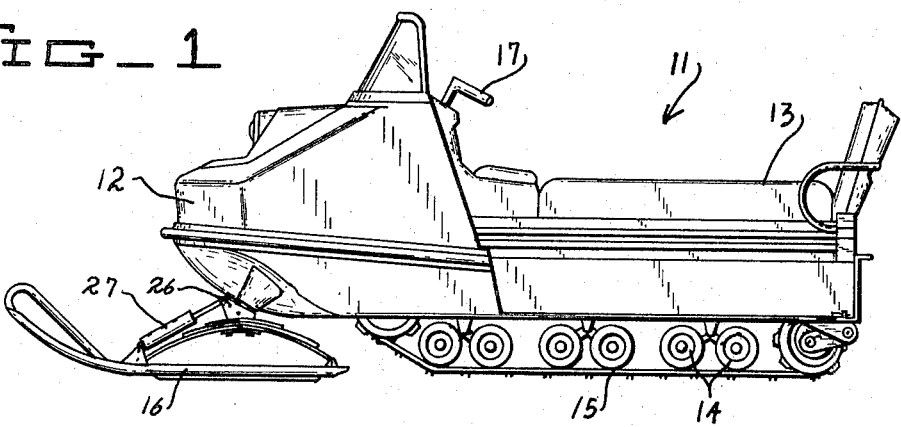
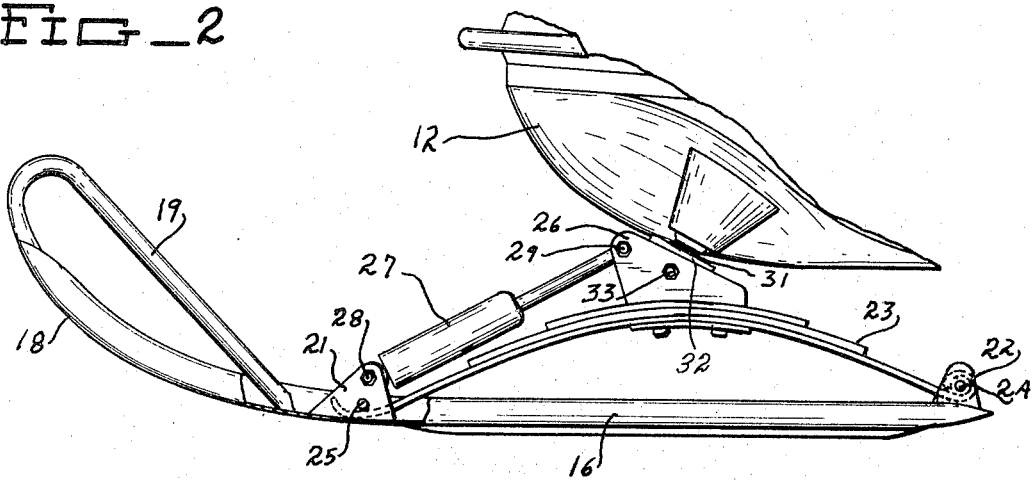
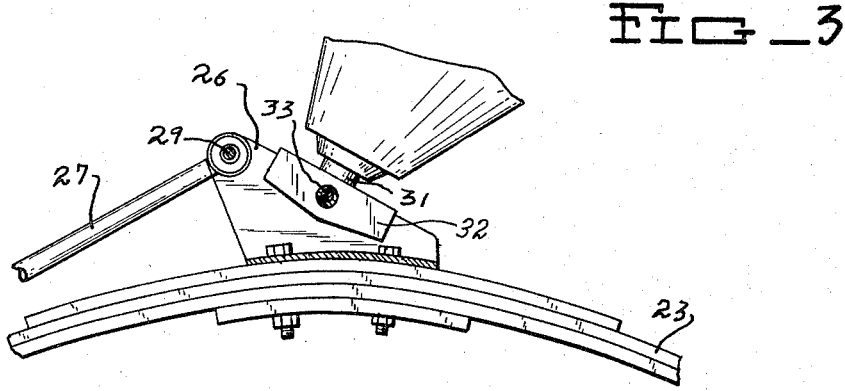

SHOCK ABSORBING SUSPENSION SYSTEM FOR A SNOWMOBILE

The invention is directed to suspension systems for snowmobiles.

One of the most significant features of the snowmobile is its ability to travel virtually anywhere, whether on or off the road, so long as a sufficient bed of snow is available. In either case the terrain is sufficiently irregular to require the use of some type of spring suspension on the snowmobile to cushion the driver from bumps and other abrupt movements.

Off-the-road travel in particular often exposes the snowmobile to extremely rough terrain, both from the standpoint of simple bumpy surfaces and extremely hilly regions. At relatively low speeds the spring suspension is capable of handling such terrain and providing a relatively smooth and controlled ride. However, at high speeds it becomes less and less difficult for the spring suspension to cause uncontrolled oscillatory movement between the skis and snowmobile that substantially lessens the driver's ability to control the snowmobile in addition to destroying the smooth ride.

The invention is, therefore, directed to a shock-absorbing suspension system that provides a solution to this problem.

The particular embodiment contemplates a suspension system including both spring and shock absorber means which, together with the ski, form a single unit which connects to the snowmobile at a single point. This is particularly advantageous from the standpoint of maintenance, repair and replacement.

The resulting device offers a smooth and controlled ride throughout the speed range of the snowmobile.

BRIEF DESCRIPTION OF THE DRAWINGS

FIG. 1 is a side view of a snowmobile employing the inventive suspension system;

FIG. 2 is an enlarged view of the suspension system; and

FIG. 3 is an enlarged sectional view of the suspension system showing its connection to the snowmobile.

DESCRIPTION OF THE PREFERRED EMBODIMENT

Referring to FIG. 1, a snowmobile represented generally by the numeral 11 is shown to include a body 12, a seat 13 on which a driver and passenger rides, wheels 14 and a track 15 for advancing the vehicle, a pair of front-running skis 16 (only one of which is shown) and a steering wheel or handle 17 for guiding the vehicle.

Referring additionally to FIGS. 2 and 3, it can be seen that ski 16 has an upturned leading edge 18 from which extends a strengthening bar or rod 19 that doubles back and is rigidly connected to the top of ski 16. Also rigidly connected to the top of ski 16 are upwardly projecting brackets 21 and 22 which have U-shaped cross-sections when viewed from the front or rear of ski 16.

A set of leaf springs 23 makes up a part of a suspension system for snowmobile 11. One end of the bottom leaf spring is curled for pivotal connection to bracket 22 by means of a pin 24. The other end of the bottom leaf spring is curled gradually to permit sliding movement on the top surface of ski 16 when leaf springs 23 are vertically displaced. A transverse pin 25 passing through bracket 21 serves to retain leaf springs 23.

Bolted to leaf springs 23 at essentially the midpoint thereof is a bracket 26 having upwardly projecting triangular sides which generally conform to the snowmobile shape for unobstructed movement, the bracket having a U-shaped cross-section when viewed from the end. In order to dampen vibrations that may occur in leaf springs 23, a piston-cylinder dashpot or shock absorber 27 is pivotally connected to bracket 21 by a pin or bolt 28 and to bracket 26 by a pin or bolt 29. Thus, ski 16, leaf springs 23 and shock absorber 27 constitute an integral unit which is connected to snowmobile 11 as described below.

Extending outwardly from snowmobile 11 is a rod 31 to which is rigidly attached a bracket 32. A rod 31 is provided for each of the front-running skis 16, and both are rotatable by steering wheel 17 through means not shown. In order to connect the aforesaid integral unit to snowmobile 11, the triangularly-shaped sides of bracket 26 are placed over bracket 32 and pin or bolt 33 is passed therethrough to provide a pivotal connection. Thus, movement of steering wheel 17 causes movement of skis 16 in an essentially horizontal plane to guide snowmobile 11, and the skis are movable in an essentially vertical plane to compensate for irregularities in the terrain.

As snowmobile 11 encounters such terrain, leaf springs 23 cushion body 12 from bumps and abrupt movements, and shock absorber 27 dampens any severe vibratory or oscillatory movement that may occur between skis 16 and snowmobile 11 as a result of extremely bumpy or hilly terrain.

What is claimed is:

1. A snowmobile having at least one relatively rigid front end supporting ski connected by suspension apparatus to a rotatable steering rod, said suspension apparatus comprising a curved leaf spring having opposite ends connected to said ski, bracket means secured to a central portion of said leaf spring and connected to said rotatable steering rod for movements of said ski in an essentially horizontal plane to guide the snowmobile and in an essentially vertical plane to compensate for irregularities in the terrain, a first mount rigidly attached to said ski and a second mount operatively connected to said curved leaf spring and, shock absorber means, which restricts motion in at least one direction, having one portion pivotally attached to said first mount and another portion pivotally attached to said second mount whereby vertical movement between said leaf spring and said ski is damped.

2. A snowmobile having at least one relatively rigid front end supporting ski connected by suspension apparatus to a rotatable steering rod, said suspension apparatus comprising:

a. a curved leaf spring having opposite ends connected to said ski;

b. bracket means secured to a central portion of said leaf spring and connected to said rotatable steering rod for movements of said ski in an essentially horizontal plane to guide the snowmobile and in an essentially vertical plane to compensate for irregularities in the terrain;

c. a first mount rigidly attached to said ski and a second mount operatively connected to said curved leaf spring;

d. and telescopic shock absorber means, which restricts motion in at least one direction, having one portion pivotally attached to said first mount and another portion pivotally attached to said second mount whereby vertical movement between said leaf spring and said ski is damped.

3. A snowmobile having a pair of relatively rigid, steerable front end supporting skis, each being connected by suspension apparatus to a rotatable steering rod, the suspension apparatus comprising:

leaf spring means operatively connected at opposite ends thereof to each of the skis;
first bracket means affixed to the center of the leaf spring means;
second bracket means affixed to the rotatable steering rod;
the first bracket means having a U-shaped cross section, the sides thereof sized and spaced to receive the second bracket means therebetween;
means for pivotally connecting the first and second bracket means, said means comprising a pin extending through said second bracket means and the sides of said first bracket means;
and piston cylinder dash pot shock absorbing means pivotally connected between the ski and the first bracket means for damping vibratory movement between the ski and the leaf spring means.

4. A snowmobile comprising:

a snowmobile body having at least one relatively rigid, steerable front end supporting ski;
leaf spring means having a central portion and opposite ends;
means including bracket means for operatively connecting the opposite ends of said leaf spring means to said ski;
piston cylinder dash pot means having first and second ends;
means including bracket means for operatively connecting said first end of said piston cylinder dash pot means to the ski; and
means for connecting a central portion of the leaf spring means and the second end of the piston cylinder dash pot means to the snowmobile body for movements of said ski in an essentially horizontal plane to guide the snowmobile and in an essentially vertical plane to compensate for irregularities in the terrain, said dash pot means acting to dampen vibratory movements between said ski and said leaf spring means in said vertical plane.

5. A snowmobile having a pair of front running skis, each being connected by suspension apparatus to a rotatable steering rod, the suspension apparatus comprising:

a. leaf spring means for yieldingly mounting each of the skis to the snowmobile, the leaf spring means having first and second ends;
b. a connector assembly comprising
  1. first bracket means affixed to the center of the leaf spring means;
  2. second bracket means affixed to the rotatable steering rod;
  3. means for pivotally connecting the first and second bracket means;
c. and third bracket means affixed to the ski, the first end of the leaf spring means being pivotally connected to the third bracket means;
d. fourth bracket means affixed to the ski for slideably retaining the second end of the leaf spring means;
e. and a shock absorber pivotally connected between the fourth bracket means and the connector assembly.

6. A snowmobile having a pair of front running skis, each ski being connected by suspension apparatus to a rotatable steering rod, the suspension apparatus comprising:

a set of leaf springs having first and second ends;
a first bracket affixed to the set of leaf springs at essentially the mid-point thereof, the first bracket having a U-shaped cross-section the sides of which project upwardly;
a second bracket affixed to the lower end of the steering rod, the second bracket having U-shaped cross section the sides of which project downwardly to be received by the sides of the first bracket;
a pin projecting transversely through the respective sides of the first and second brackets to provide a pivotal connection therebetween;
a third bracket affixed to the ski toward the trailing portion thereof, the first end of the set of leaf springs being pivotally connected thereto;
a fourth bracket affixed to the ski toward the leading portion thereof, the fourth bracket including means for slidably retaining the second end of the set of leaf springs;
and a shock absorber having first and second ends, the first end being pivotally connected to the first bracket and the second end being pivotally connected to the fourth bracket.

7. A snowmobile having a pair of front running skis, each being connected by suspension apparatus to a rotatable steering rod, the suspension apparatus comprising:

leaf spring means for yieldingly mounting each of the skis to the snowmobile, the leaf spring means having first and second ends;
first bracket means affixed to the center of the leaf spring means;
second bracket means affixed to the rotatable steering rod;
means for pivotally connecting the first and second bracket means;
third bracket means affixed to the ski, the first end of the leaf spring means being pivotally connected to the third bracket means;
fourth bracket means affixed to the ski for slidably retaining the second end of the leaf spring means;
and shock absorbing means pivotally connected between the fourth bracket means and the first bracket means for damping vibratory movement between the ski and the leaf spring means.

8. The device as defined by claim 7, wherein the fourth bracket means is disposed between the third bracket means and the leading portion of the ski.

* * * * *